Nov. 22, 1949  E. A. KOOYMAN  2,488,729

MAGNETO ROTOR

Filed Oct. 18, 1946

Inventor:
Evert A. Kooyman.
By Paul O. Pippel
Atty.

Patented Nov. 22, 1949

2,488,729

UNITED STATES PATENT OFFICE 2,488,729

MAGNETO ROTOR

Evert A. Kooyman, Chicago, Ill., assignor to International Harvester Company, a corporation of New Jersey Application October 18, 1946, Serial No. 704,135

7 Claims. (Cl. 171—209)

This invention concerns dynamo machines and has more to do particularly with an improved rotor structure of the permanent magnet type commonly employed in spark ignition magnetos for internal combustion engines.

The general object of this invention is the provision of a rotor structure wherein a rotor shaft formed separately from a rotary permanent magnet member can be conveniently assembled within a hole extending axially through the rotary magnet member and having transverse dimensions which are less than that of sections of the shaft at opposite ends of the hole, making it impossible to insert the completely fabricated shaft endwise through the hole for proper registry in assembling with the magnet member. This object is accomplished by making the rotor shaft in the form of two components, each of which has an end portion insertable into the magnet member hole from a respective end thereof into end-to-end relation pursuant to being assembled coaxially with the magnet member.

The invention further contemplates and has for one of its objects the employment of a nonmagnetic body of material molded or cast into position within the magnet member hole and about the end portions of the shaft components projecting into the hole as an expedient for maintaining the parts in permanent coaxial assembly.

These and other desirable objects of more specific nature will become readily apparent from the ensuing description and the annexed drawing, wherein:

Fig. 2 is a view taken similarly to Fig. 1, but at a plane rotated 90° from the plane upon which Fig. 1 is taken. This view is taken at the plane indicated by the line 2—2 of Fig. 3.

Figure 1:
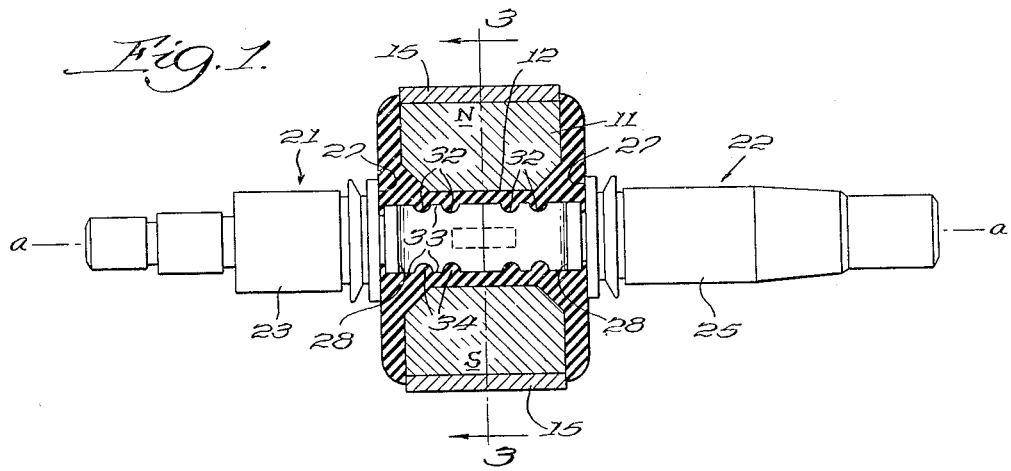
Fig. 1 is a sectional view taken axially through a magneto rotor embodying a preferred form of the present invention and showing the rotor shaft components in side elevation. This view is taken on the plane indicated by the line 1—1 in Fig. 3.
Figure 2:
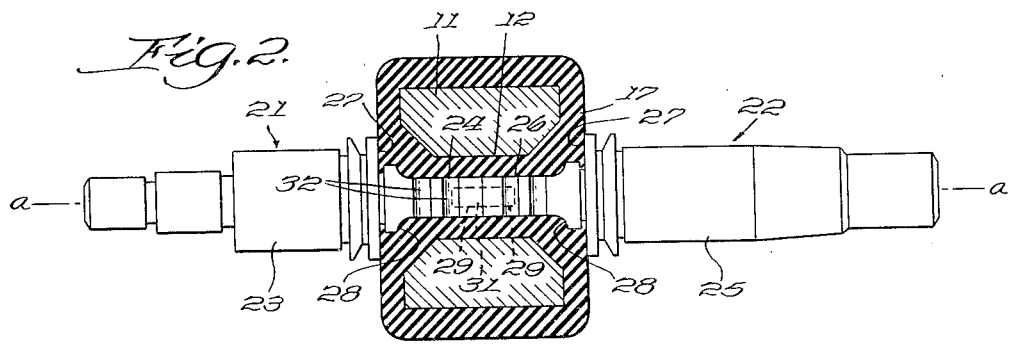

With continued reference to the drawings, the preferred form of the invention therein illustrated is assembled in and about a permanent magnet rotor member 11. This rotor member is a permanent magnet constructed of a material such as Alnico having high permeability. The rotational axis for the member 11 and for the completely assembled rotor is indicated by the line $a$—$a$ in Figures 1 and 2 and by the point $a$ in Figure 3 where the axis appears as a point. The rotor magnet member 11 is elliptical in transverse section and has zones of opposite polarity arbitrarily designated N and S in Figures 1 and 3. These north and south pole zones are diametrically opposite and aligned with the principal axis of oblong transverse sections of a hole 12 extending completely through the magnet member in coaxial relation therewith. The major axis of the elliptical transverse sections of the rotor magnet member 11 and of the oblong hole 12 coincide with the plane indicated by the line 1—1 in Figure 3.

Figure 3:
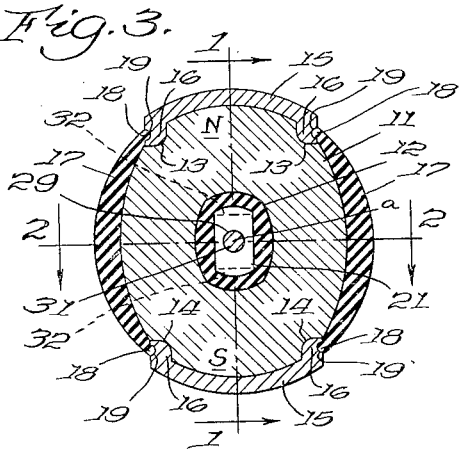
Fig. 3 is a transverse sectional view taken on the line 3—3 of Fig. 1.

The axially extending edges of the N pole portion of the rotor have axially extending grooves 13 therein and similar grooves 14 are likewise associated with the S pole portion. Soft iron pole pieces 15 cover the N and S pole portions and have edge flanges 16 which fit into the grooves 13 and 14 as shown in Figure 3. The pole pieces 15 are retained in position by a body 17 of non-magnetic material such as a thermosetting plastic molded or cast into place and having edge portions 18 which project into grooves 19 which are formed lengthwise of and within the pole piece flanges 16.

Prior to applying the non-magnetic body 17 to the structure, a pair of rotor shaft components 21 and 22 are co-assembled with one another and positioned relatively to the rotor magnet 11 in the manner illustrated in the three figures of the drawing. Rotor shaft component 21 has an outer end portion 23 which is of larger diameter than the greatest transverse dimension of a flattened inner end portion 24. Similarly, the shaft component 22 has an outer end portion 25 which is of greater diameter than the greatest transverse dimension of a flattened inner end portion 26. Each of the shaft components 21 and 22 has shoulders 27 and 28 between the outer portions and the flattened inner portions thereof. Each shaft counterpart also has an end recess 29, and such recesses together with a pin 31 having its ends inserted thereinto constitute a means providing a telescopic assembly between the shaft ends for initially retaining them in a coaxial relation.

The inner end portions 24 and 26 of the shaft components are so disposed rotatively that the principal axes of their elongated transverse sections coincide with the plane indicated by the line 1—1 in Figure 3. The shorter sides of the flattened end portions 24 and 26 are traversed by grooves 32 which form transversely projecting portions 33 for interlocking with rib-like portions 34 of the body 17. While the shaft components, the magnet member 11, and the pole shoes 15 are temporarily clamped and held in the relative positions of their assembly illustrated in the drawing, the body of material 17 is caused to flow into the space between the side walls of the hole 12 and the inner end portions of the shaft components 21 and 22 and into the grooves 19 of the pole shoes 15 while the material is fluidal. The fluidal material is confined by a mold or the like so that the exposed periphery thereof shown in the drawing conforms to the desired shape. The fluidal body is thus confined until it solidifies. Following solidification of the body 17, the various parts of the assembly will be retained thereby in the relative positions illustrated.

Having thus described a single embodiment of the invention with the view of clearly and concisely illustrating the same, I claim:

1. In a magneto rotor, a rotor magnet member having a hole extending axially therethrough, rotor shaft components having respective end portions inserted axially into the magnet member hole from opposite ends thereof and disposed in coaxial end-to-end relation, said shaft component end portions having less transverse expanse than said hole whereby the circumferential periphery of said end portions is spaced from the side walls of said hole, means projecting axially of and between the shafts to maintain them in axial alinement, and a non-magnetic material molded into the space between said shaft end portions and the side walls of said hole for maintaining the parts coaxially assembled.

2. In a magneto rotor, a rotor magnet member having a hole extending axially therethrough, rotor shaft components having respective end portions inserted axially into the magnet member hole from opposite ends thereof and disposed in coaxial end-to-end relation, said shaft component end portions having less transverse expanse than said hole whereby the circumferential periphery of said end portions is spaced from the side walls of said hole, said end portions having axial surface elements of which a part adjacently to the free ends of said portions are disposed a greater distance radially outwardly from the principal axis of said portions than a part of such surface elements nearer to the opposite ends of such components, a non-magnetic material molded into the space between said end portions and the side walls of said hole for maintaining the parts coaxially assembled, and means projecting axially of and between the shafts to maintain them in axial alinement.

3. In a magneto rotor, a rotor magnet member having a hole extending axially therethrough, rotor shaft components having respective end portions inserted axially into the magnet member hole from opposite ends thereof and disposed in coaxial end-to-end relation, said shaft component end portions having less transverse expanse than said hole whereby the circumferential periphery of said end portions is spaced from the side walls of said hole, said shaft components having sections exteriorly of the rotor member hole which are of greater tranverse expanse than such hole, a non-magnetic material molded into the space between said shaft end portions and the side walls of said hole for maintaining the parts coaxially assembled, and radially protruding means on said end portions for coacting with the molded material for resisting axial withdrawal of the shaft components from the magnet member.

4. In a magneto rotor, a rotor magnet member having a hole extending axially therethrough, rotor shaft components having respective end portions inserted axially into the magnet member hole from opposite ends thereof and disposed in coaxial end-to-end relation, said shaft component end portions having less transverse expanse than said hole whereby the circumferential periphery of said end portions is spaced from the side walls of said hole, means providing a telescopic assembly between the shaft component end portions for guiding them into coaxial relation and initially retaining them in such coaxial relation, a non-magnetic material molded into the space between said shaft end portions and the side walls of said hole for maintaining the parts coaxially assembled, and said shaft components having sections exteriorly of the rotor member hole that have greater transverse expanse than such hole and that are slightly spaced from respective ends of the rotor member to cooperate therewith in bounding space for receiving a portion of the non-magnetic material to project axially outwardly of the rotor member hole and radially onto the ends of the rotor member.

5. In a magneto rotor, a rotor magnet member having a hole extending axially therethrough, rotor shaft components having respective end portions inserted axially into the magnet member hole from opposite ends thereof and disposed in coaxial end-to-end relation, said shaft component end portions having less transverse expanse than said hole whereby the circumferential periphery of said end portions is spaced from the side walls of said hole, said shaft components having portions adjacent to said end portions having a greater radial expanse whereby shoulders are provided by the adjacent portions in opposed axially-spaced relation with respective ends of the rotor member, and a non-magnetic material molded in the space between said shaft end portions and the side walls of said hole and also between said shoulders and the ends of the rotor member for maintaining the parts assembled in said coaxial relation and preventing relative axial movement thereof.

6. In a magneto rotor, a rotor magnet member having diametrically opposite magnetic pole portions and a hole extending axially through such member, said hole being oblong in transverse section and being so disposed within the magnet member that the principal axis of the transverse sections of said hole extends between said magnetic poles, rotor shaft components having respective flattened end portions inserted axially into the magnet member hole from opposite ends thereof and disposed in coaxial end-to-end relation, the principal axis of the transverse sections of said end portions disposed coincident with the principal axis of the transverse sections of said hole, said shaft component end portions having their circumferential peripheries in spaced relation from the side walls of said hole, a non-magnetic material molded into the space between said shaft end portions and the side walls of said hole for maintaining the parts coaxially assembled, and means providing a telescopic assembly between the shaft component end portions to initially maintain them axially alined.

7. In a magneto rotor, a rotor magnet member having diametrically opposite magnetic pole portions and a hole extending axially through such member, said hole being oblong in transverse section and being so disposed within the magnet member that the principal axis of the transverse sections of said hole extends between said magnetic poles, rotor shaft components having respective flattened end portions inserted axially into the magnet member hole from opposite ends thereof and disposed in coaxial end-to-end relation, means interconnecting said end portions to prevent relative lateral displacement thereof, the principal axis of the transverse sections of said end portions disposed coincident with the principal axis of the transverse sections of said hole, said shaft component end portions having their circumferential peripheries in spaced relation from the side walls of said hole, groove means traversing the shaft component end portions transversely of their narrow peripheral sides, and a non-magnetic material molded into the space between said shaft end portions, said groove means and the side walls of said hole for maintaining the parts in coaxial relation and resisting axial withdrawal of said shaft portions from said magnet member.

EVERT A. KOOYMAN.

REFERENCES CITED

The following references are of record in the file of this patent:

UNITED STATES PATENTS

| Number | Name | Date |
|---|---|---|
| 732,804 | Walter | July 7, 1903 |
| 2,161,953 | Dunham | June 13, 1939 |
| 2,213,724 | Vogel | Sept. 3, 1940 |
| 2,249,848 | O'Brien | July 22, 1941 |
| 2,305,125 | Wolferz | Dec. 15, 1942 |